CHECKING CIRCUITRY FOR DATA PROCESSING APPARATUS

Filed Aug. 31, 1956 4 Sheets-Sheet 1

INVENTOR
BERNARD COLTEN
ROY W. REACH, JR.
BY Henry L. Hanson
ATTORNEY

CHECKING CIRCUITRY FOR DATA PROCESSING APPARATUS

Filed Aug. 31, 1956 4 Sheets-Sheet 2

INVENTOR.
BERNARD COLTEN
ROY W. PEACH, JR
BY Kenny L. Hanson
ATTORNEY

CHECKING CIRCUITRY FOR DATA PROCESSING APPARATUS

Filed Aug. 31, 1956 4 Sheets-Sheet 3

INVENTOR.
BERNARD COLTEN
ROY W. REACH, JR.
BY Henry L. Hanson
ATTORNEY

Dec. 12, 1961 B. COLTEN ET AL 3,012,722

CHECKING CIRCUITRY FOR DATA PROCESSING APPARATUS

Filed Aug. 31, 1956 4 Sheets-Sheet 4

INVENTOR.
BERNARD COLTEN
ROY W. REACH, JR.
BY Henry L. Hanson
ATTORNEY

United States Patent Office 3,012,722
Patented Dec. 12, 1961

3,012,722
CHECKING CIRCUITRY FOR DATA PROCESSING APPARATUS

Bernard Colten, Waltham, and Roy W. Reach, Jr., Sudbury, Mass., assignors, by mesne assignments, to Minneapolis-Honeywell Regulator Company, a corporation of Delaware Filed Aug. 31, 1956, Ser. No. 607,403
13 Claims. (Cl. 235—153)

A general object of the present invention is to provide a new and improved checking circuit for an electrical controller. More specifically, the present invention is concerned with a new and improved circuit for checking the operation of a circuit function monitor where the checking is accomplished by utilizing a functional operation of the circuit function monitor.

In electrical data processing apparatus, the information used in the apparatus for control purposes and to represent data being processed appears in the form of groups of electrical impulses spaced in a predetermined manner to represent suitable control information or data. The electrical impulses are sometimes referred to as words which contain a predetermined number of bits. In most data processing apparatus, the bits in any particular word are formed by groups of zeroes and ones in some form of binary representation.

As the words are processed in the apparatus and transferred from one place to another, there is always the danger that there will be a loss of the information or a pulse will be produced in the formation where it is not desired. One way of checking the correctness of any particular set of information pulses is to append thereto a satellite number which is generated in accordance with the number and position of the pulses in any word. The satellite number is frequently referred to as the weight count. The weight count or satellite number carried in the word is examined with respect to a second weight count which is generated every time the information is used or transferred. A representative weight count checking circuit is disclosed in the patent of R. M. Bloch, Number 2,634,052, issued April 7, 1953.

As disclosed in the Bloch patent, if there is a failure in the central apparatus to transfer information properly, the generated weight count will not agree with the satellite weight count and a signal will be generated which will be effective to stop the central apparatus operation. With apparatus of this type, there is the ever present danger that there will be a failure in the weight count checking circuits. One way of overcoming this is to duplicate the weight check circuits. This, however, is very costly from the equipment standpoint and inherently adds to the amount of equipment where a circuit failure is possible and consequently increases the servicing problems on the apparatus.

It is accordingly a further more specific object of the present invention to provide a monitor circuit for a data processing apparatus weight count circuit which may be checked without the necessity of circuit duplication.

The foregoing object is achieved in the present invention by a unique combination of circuits built around the basic checking circuits whereby the checking circuit is examined or monitored at selected times when the check signal is present and at other selected times when the check circuit is supplied with a generated error signal. If there is a check signal present at the time that the check signal should be present, the apparatus operation will continue. Similarly, if the generated error signal has caused the check circuit to indicate an error, the apparatus operation will continue. However, if the check circuit does not produce a check signal when it is desired, or the check circuit produces a check signal when it is not desired, then the associated circuitry will be stopped and the processing apparatus will be stopped. These circuit checking features have been achieved in the present invention with a minimum expenditure of equipment and in a form which greatly enhances the over-all reliability of the check circuit and the associated processing apparatus.

It is accordingly a further specific object of the invention to provide a monitor circuit for a data processing check circuit where the check circuit is periodically examined for its correctness of operation both at the time that it is expected to produce a monitor signal and at a time when it is expected to produce a circuit failure signal as produced by a generated error input to the check circuit.

In other areas of the central apparatus operation, it is sometimes desirable to provide duplicate functions in order to check one circuit against another. A representative example of an area where duplicate functions are provided in a central apparatus, might be on a circuit designed to sense the sign of a numeric word being processed in the apparatus. This sign for the word may be suitably stored in the word in a particular bit position and this bit position is examined to determine if the sign is plus or minus are represented by a "1" and a "0," for example. In order to be sure that the information in the sign position is correctly examined, it is common practice to provide two circuits for checking the sign bit position. If the two circuits agree, the likelihood of any error being present is considerably reduced. If the duplicate functions are in agreement, it is desired that apparatus operation continue. However, if duplicate functions do not agree in their end result, it is desired that the apparatus operation stop. For this purpose, the duplicate function circuits are examined and a checking circuit is provided for producing an apparatus proceed or apparatus stop signal. This latter circuit may also be subject to failure and consequently it is desirable to provide the periodic monitoring of the operability of this check circuit.

As with the weight count monitor circuit, the duplicate function check circuit may be periodically monitored to determine if the circuit is operating correctly. This may be accomplished by examining the check circuit to see if it has an output when an output is desired and directing the apparatus operation to continue if that output is present. At a subsequent time, the check circuit is supplied with a generated error signal so that the circuit is caused to indicate a failure. If the circuit does not indicate a failure, the apparatus operation will be stopped.

It is therefore a further object of the present invention to provide a new and improved circuit for monitoring the operation of a duplicate function check circuit of a data processing apparatus where the check circuit is supplied with an error signal periodically and the circuit is examined to see if the error signal is reflected through the monitoring circuit.

The weight count monitor circuit and the duplicate function monitor circuit may be suitably combined so as to further reduce the amount of circuitry required in the over-all monitoring circuitry for the central apparatus. This has been achieved in the present invention by closely interrelating the monitoring functions of the weight count monitor and the duplicate function monitor in a manner to be fully described below.

It is accordingly a still further more specific object of the invention to provide a new and improved checking circuit monitor for a data processing apparatus where a weight count monitor and a duplicate function monitor are combined to control the operation of the data processing apparatus.

The various features of the novelty which characterize the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
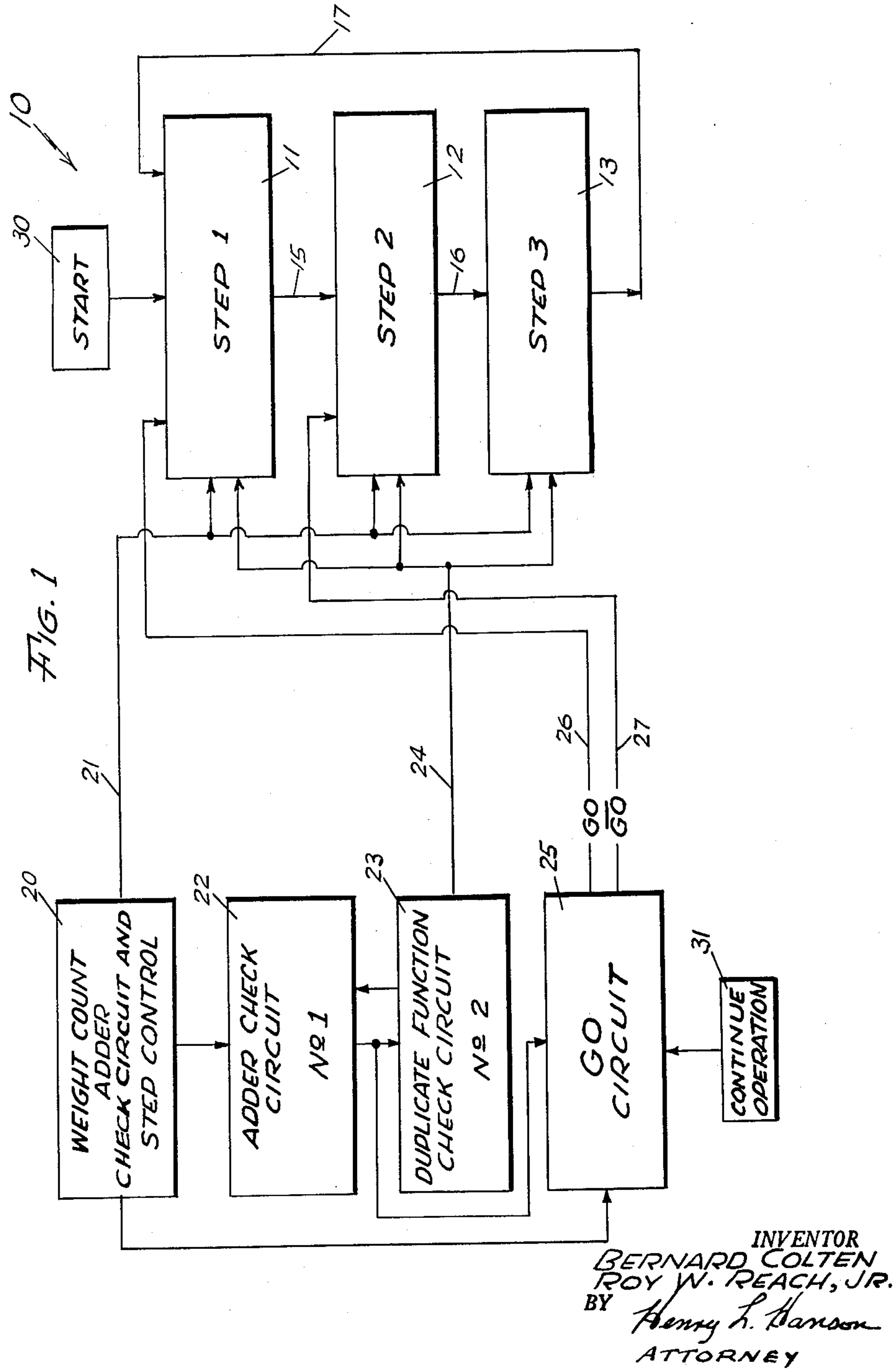
FIGURE 1 represents a diagrammatic showing of the over-all functions of the present invention.

Referring first to FIGURE 1 the numeral 10 represents in block diagram form a control circuit or controller for a data processing apparatus. It is assumed that this data processing apparatus is of the type having a plurality of minor cycles of operation which, in the present specification, are designated as "steps." These steps in the present data processing apparatus are generated by three different stages: 11, designating step 1; 12, designating step 2; and 13, designating step 3. When all of the minor cycles or steps of the data processing machine have been completed, a major cycle of the machine operation will have been completed. As shown in FIGURE 1, the representative control circuit has three steps in the major cycle. It will be readily apparent that a considerable number of steps beyond three may be incorporated in the major cycle. However, for purposes of the present specification, the steps of the major cycle have been designated as three.

The three stages of the controller 10 are adapted to be operative in sequence starting first with stage 11 and finishing with stage 13. The operation is sequential starting with the stage 11 whose output is coupled to stage 12 by lead 15. The output of the stage 12 is coupled to stage 13 by the lead 16. If a further major cycle is contemplated, there is a recirculation on the output of stage 13 to the input of stage 11 by way of lead 17.

Also shown in FIGURE 1 is a weight count adder check or monitor circuit 20 which is adapted to produce on the output thereof a step control or a step initiating pulse at a predetermined time. The output of this step control or weight count adder check circuit is sent by way of lead 21 to each of the step stages 11, 12, and 13. After the initial starting operation, the lead 21 must have a predetermined signal thereon before any subsequent steps can be accomplished in the major cycle of the machine.

Also included is an adder check or monitor circuit number 1 carrying the reference numeral 22. This adder check circuit number 1 co-operates with a duplicate function check or monitor circuit 23 to produce a control output on an output lead 24 which is also required to be of a selected type in order for the apparatus to advance to the next step or minor cycle of the machine control circuit 10.

Also included in FIGURE 1, is a GO circuit 25 which is used to initiate the second major cycle and to control the beginning of the second step or minor cycle. The GO circuit is shown with two outputs, one output lead 26 being connected to the stage 11 and being active when the GO line is active. The other output line 27 connects to stage 12 and has a $\overline{\text{GO}}$ output which is active at all times that the GO line is not up.

In considering the operation of the circuit set forth in FIGURE 1, the initial minor cycle is started in the stage 11 by applying an appropriate starting signal from a suitable starting device 30. When the first step or minor cycle has been completed, the control circuit will step to the second step or minor cycle if the necessary inputs are supplied thereto. These inputs include a step signal on the output of the weight count adder check circuit 20 by way of lead 21 to step stage 12, a duplicate function check circuit output signal from the check circuit 23 applied to the stage 12 by way of lead 24, and a $\overline{\text{GO}}$ signal applied by the GO signal circuit 25 by way of lead 27 to the stage 12. If all of the foregoing signals are present, the apparatus control will be conditioned for the second step or minor cycle and will be stepped in to step 2 by the pulse from the step control 20. Upon the completion of the second minor cycle, the apparatus will step to step 3 providing again there is a weight count step control signal from the weight count adder check circuitry 20 applied by way of lead 21 to the stage 13 and a duplicate function check signal from check circuit 23 applied to the stage 13 by way of lead 24. The circuit will continue through the third minor cycle or step.

If the continue operation circuit 31 is active and applying a signal to GO circuit 25, the output line 26 of the GO circuit 25 will be active and will condition the controller 10 for a second major cycle with the output of step 3 being applied by way of lead 17 to the input of the stage 11. At the same time, the GO signal from the GO circuit 25 is applied thereto by way of the lead 26. In order to get into the first minor cycle in stage 11, it is also necessary to have the step control signal on lead 21 applied to the stage 11 and the duplicate function check circuit 23 with an output signal on the line 24 which also feeds the stage 11.

The circuit will continue to operate in the foregoing manner through a number of major cycles until the continue operation circuit 31 is de-activated at which time the major cycle then in progress will be completed and the apparatus will stop.

If there should be a failure in the operation of the weight count adder check circuit 20 so that there is no step control output signal on lead 21, there will be no stepping between the individual minor cycles. Similarly, if the duplicate function check circuit 23 indicates a failure, there will be no stepping of the control 10 between minor cycles as the check pulse is required between each of the stages of the control.

Insofar as the GO circuit 25 is concerned, in order for the second major cycle to be initiated and any subsequent major cycle after the actuation of the start source 30, the GO circuit output line 26 must have a control pulse indicating that the control circuitry is conditioned for further operation. Before the apparatus can step from step 1 to step 2, it is necessary to check the GO circuit 25 to see if the circuit can be deactivated, and if it can be deactivated, the output line 27 will be conditioned with an output signal $\overline{\text{GO}}$ so as to permit the apparatus to enter into the second minor cycle or step 2. If there is no $\overline{\text{GO}}$ signal on the lead 27, the apparatus will never enter minor cycle 2 and will stop. In this way, the GO circuit is checked each major cycle of the apparatus operation to insure that it is operating properly and capable of indicating both a GO and a $\overline{\text{GO}}$ signal, the $\overline{\text{GO}}$ signal normally being active when there is an error in the circuitry except when it is forced into the $\overline{\text{GO}}$ condition by the check circuitry as will be explained below.

Figure 2:
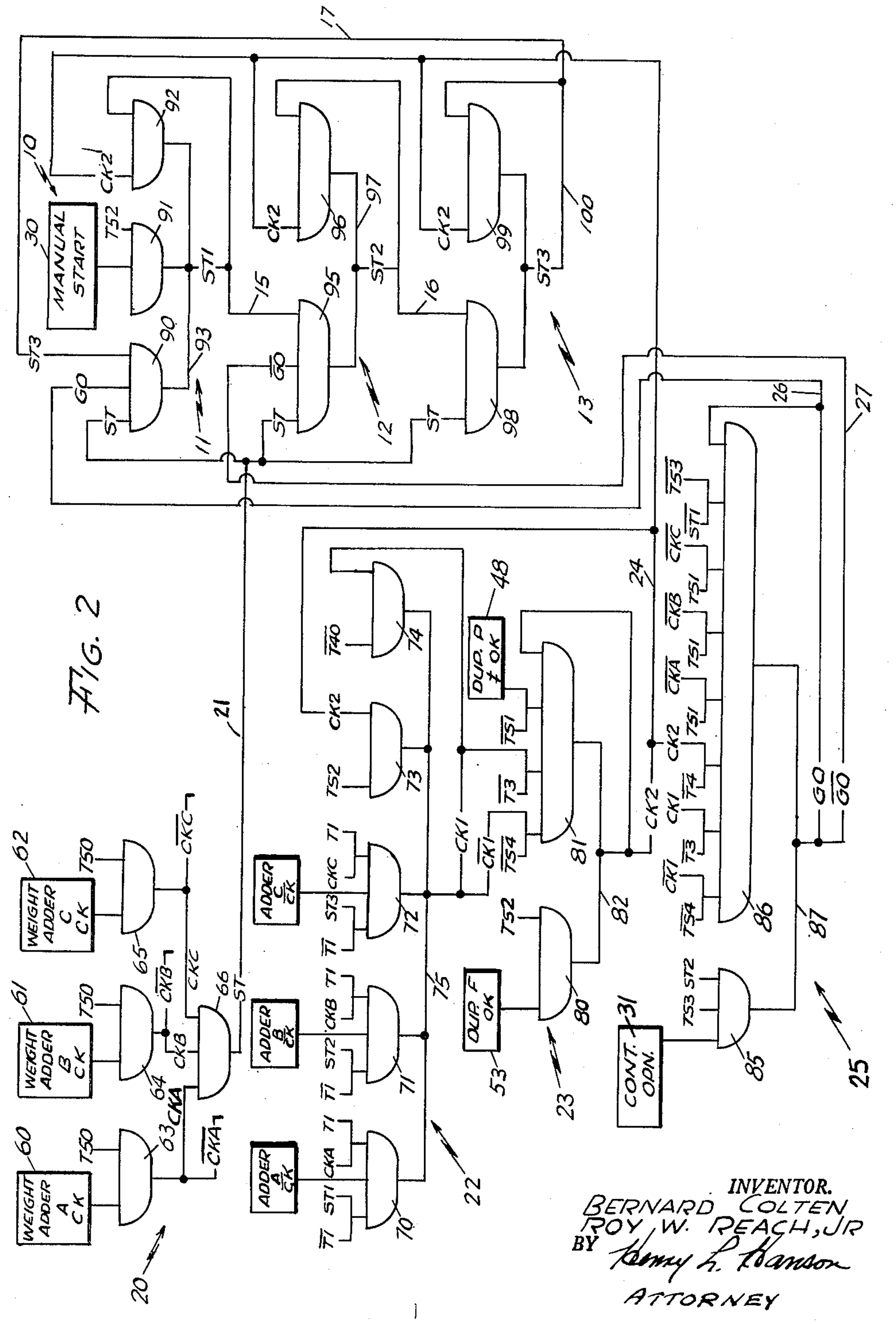
FIGURE 2 is a logical diagram showing the principles of the present invention applied to a data processing apparatus control circuit.

Referring now to FIGURE 2, there is here shown in greater detail the over-all logical implementation of the apparatus set forth in FIGURE 1. The logical implementation has been effected by the use of a plurality of circuit buffers and gates adapted for passing and excluding certain signals depending upon the type of control action desired.

Figure 3:
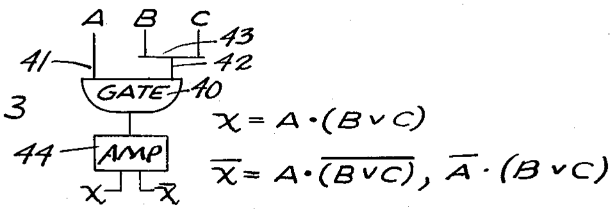
FIGURE 3 is a logical schematic showing of one of the elements of the logical diagram of FIGURE 2 showing a buffer-gate structure.

The logical buffer-gate structure shown in FIGURE 3 is one of the configurations used in the over-all circuit in FIGURE 2 and will be seen to comprise a gate 40 having a pair of input gate legs 41 and 42. Connected to the input of the gate leg 42 is a buffer line 43. In FIGURE 3 it is assumed that an input function A is connected to the gate leg 41 and that a pair of input functions B and C are connected to the buffer line 43 leading to the gate leg 42.

The output of the package incorporating the buffer gate structure shown on FIGURE 3 will include a reshape amplifier 44 and will be such that there will be an output pulse on the output lead X if there has been an input pulse on gate leg 41 and an input pulse on either of the input legs B or C or B and C simultaneously. This output pulse will appear at the output lead one pulse period after it is applied at the input.

The output line $\overline{X}$ will be active whenever there is not a simultaneous occurrence of a signal on the gate leg 41 and the gate leg 42. This will mean that if there is a pulse on the input gate leg 41 from the function A, and there is no input from either B or C on the gate leg 42, the output $\overline{X}$ will be active. Similarly, if there is no input on the gate leg 41 from the function A and there is an output from functions B or C, the output line $\overline{X}$ will still be active. Further, if there is no input from either functions A, B, or C, the output line $\overline{X}$ will be active. This type of circuit is well known in the art and representative teachings for this will be found in an article by Norman Zimbel entitled "Packaged Logical Circuitry for a 4 mc. Computer," Convention Record of I.R.E., 1954, part 4, at pages 133 to 139. Another showing will be found in an article by Frank Dean entitled "Basic Gating Package for Computer Operations," Electronic Equipment, February 1956, pages 14 to 17.

Figure 4:
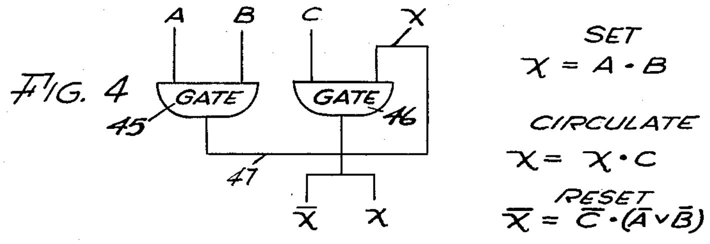
FIGURE 4 is a diagrammatic showing of a recirculating type combination used in the logical circuitry of FIGURE 2.

In FIGURE 4, there is shown a gate-buffer combination with a recirculation path. One gate 45 has a pair of input gate legs adapted to be energized by functions A and B respectively. A second gate 46 is adapted to have one input gate leg activated by a function C and a second gate leg activated by a recirculation circuit X from the output buffer line 47. The line X will be active one pulse period after a pulse is applied to the input as in the case of FIGURE 3 circuit.

In FIGURE 4, if both functions A and B occur on the input gate 45, there will be an output pulse on the output line X. There will be a recirculation of this pulse through the gate 46 if the function C is active on the gate 46. Thus, if an initial pulse is introduced to buffer line 47 by way of the gate 45, this pulse will continue to circulate through the gate 46 so long as the function C is holding the gate 46 open.

If either or both functions A and B are not active, and C is not active, there will be no pulse produced on the buffer line 47 and the output line $\overline{X}$ will be active. Insofar as the recirculation is concerned, the output line $\overline{X}$ will be active if the function C on the gate leg of gate 46 is not active and there has been no pulse produced in the buffer line 47 from the gate 45.

Figure 5:
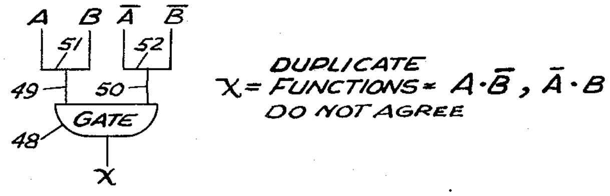
FIGURE 5 shows a logical diagram for implementing a duplicate check function.

In FIGURE 5 a duplicate function check circuit is shown and this particular circuit is adapted to produce an output pulse X when the duplicate functions do not agree. It is assumed that in FIGURE 5 that A and B are normally identical and if they are not identical, then it is desired to produce a signal on the output of the gate. The structure set forth in FIGURE 5, comprises a gate 48 having a pair of input gate legs 49 and 50. Feeding the gate legs 49 and 50 are a pair of buffer lines 51 and 52. Buffered together on the buffer line 51 are functions A and B. Buffered together on the buffer line 52 are functions $\overline{A}$ and $\overline{B}$. If functions A and B are identical, both inputs to the buffer line 51 at A and B will be present and there will be no input to the buffer lines 52. Consequently, only gate leg 49 will be active and the gate 48 will remain closed so that there will be no ouput from the gate 48. If functions A and B are not identical, so that function A is present and function $\overline{B}$ is present, both the gate legs 49 and 50 will be active and there will be an output from the gate 48. Conversely, should the function B be present and the function $\overline{A}$ be present, there would again be an output from the gate 48.

Figure 6:
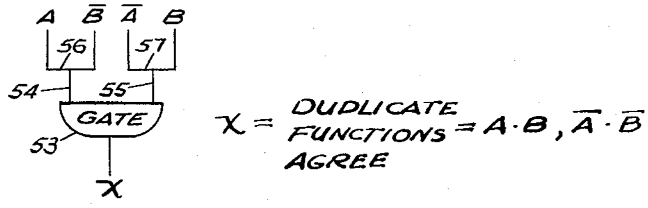
FIGURE 6 shows a further diagrammatic showing of a circuit element for accomplishing a different duplicate circuit check function.

In FIGURE 6, the buffer gate structure shown has been used to implement a circuit for producing an output pulse or signal when the duplicate functions A and B agree. In this figure, there is shown a gate 53 having a pair of input gate legs 54 and 55. Connected to the gate leg 54 is a buffer line 56 while coupled to the gate leg 55 is a buffer line 57. The functions A and B are arranged to be applied to the buffer lines 56 and 57 respectively. If both functions A and B are present, the gate legs 54 and 55 will be active and the gate 53 will produce an output pulse at X. If the function A is not present as represented by the input $\overline{A}$ and the function B is not present as represented by $\overline{B}$, then again an output signal will be produced on the gate 53. However, if function A is present and function B is not present, or function B is present and function A is not present, there will be no output from the gate 53.

Figure 7:
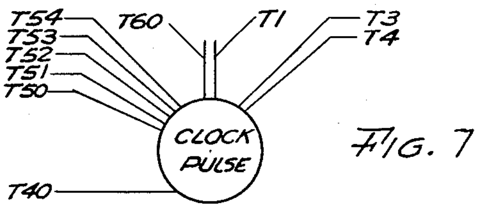
FIGURE 7 is a diagrammatic showing of a timing signal source for the present circuit.

In FIGURE 7 there is shown a diagrammatic representation of a clock pulse circuit adapted to be used in the apparatus of FIGURE 2. It is assumed that this clock is a recirculating type clock which produces a pulse at time T1 and that this pulse will appear sixty pulse periods later back at T1 again. In actual implementation, this clock pulse generator may well take the form of an amplifier-delay line combination wherein there is recirculation and taps along the delay line with the desired pulse delay between the taps. As shown in FIGURE 7, the clock used in the present apparatus has output connections at T1, T3, T4, T40, T50, T51, T52, T53, T54 and T60. Whenever any particular output terminal does not have a pulse thereon at the selected time interval, there will be a further output negation signal representative of the fact that there is no output and this will be shown in the diagram in FIGURE 2 as $\bar{t}_n$. In other words, on this other output at the particular terminal, the output line will be active except at the particular instant $t_n$. At this instant, the particular output lead will be deactivated.

Referring more specifically to FIGURE 2, the weight count adder check or monitor circuit 20 comprises three separate weight adder check circuits; 60, 61, and 62 representing the logical outputs of three weight count adders when they check properly. Each of these weight adder check circuits may take the form of the check circuit shown in the above mentioned Bloch patent. The check circuit is arranged to produce an output puse, if the desired weight check has been made, at time T51. At some time before T1, the weight adder check circuits will be cleared. The weight adder check circuits 60, 61, and 62 are connected to gates 63, 64, and 65. Connected to the inputs of each of the gates 63 through 65 is an additional gate leg which is adapted to be activated at time T50 by the clock pulse from a circuit of the type discussed in connection with FIGURE 7.

Each gating circuit in combination with the associated amplifier is arranged so that a pulse applied to the input will appear at the output, when the gate is open, one pulse period later. Consequently, when the gate 63 was opened at time T50, a pulse will be passed through the gate and will appear upon the output lead at time T51. The output of the gates 63, 64 and 65 are connected to the input of a further gate 66. The gate 66 will be opened if there is a check pulse received from each of the weight adder check circuits 60, 61 and 62. If there is not such a pulse from each of the weight adder check circuits, there will be no output from the gate 66. When present, there will be a step pulse ST on the output line 21 at time T52 which will activate one of the input gate legs associated with the operation controller 10.

The adder check or monitor circuit 22 comprises a plurality of gate circuits, 70, 71, 72, 73 and 74. The gate 70 has connected to the input thereof three gate legs. The first gate leg is adapted to be made active whenever there is a $\overline{T1}$ or a step 1, ST1, signal present on the buffer line associated with the gate leg. The second gate leg is a gate leg which is adapted to be actuated by the weight adder check circuit 60 when the weight adder check circuit is cleared. As mentioned above, this weight adder check circuit will be cleared after T50 and before time T1. The third gate leg of the gate 70 is adapted to be activated by a check pulse on the output of the gate 63, CKA, or the clock pulse T1.

The gate 71 also has three input gate legs. The first gate leg is adapted to be activated whenever a $\overline{T1}$ signal is present or there is a step 2, ST2, signal present. The second leg of the gate 71 is adapted to be active whenever the adder check circuit 61 has been cleared. This adder check circuit will have been cleared normally before time T1 and after time T50. The third gate leg is adapted to be made active on the gate 71 whenever the check pulse CKB on the output of the gate 64 is active or the clock pulse T1 is present.

The gate 72 has inputs corresponding to those of gate 70 and 71 except that here the adder check circuit 62 is checked. As with the other gates, the gate 72 has three input gate legs. The first gate leg is adapted to be actuated by a signal $\overline{T1}$ or an output ST3 from the step 3 stage 13 of the operation controller 10. The second gate leg of the gate 72 is adapted to be active when the weight adder 62 has been cleared. The third gate leg on the gate 72 is adapted to be active whenever there is a CKC on the output of the gate 65 or there is a clock pulse T1.

The gate 73 has two input gate legs, one of which is adapted to be active at time T52 and the other which is adapted to be active when there is a check pulse CK2 on the second check or monitor circuit 23.

The gate 74 is a recirculation gate for the adder check circuit 22 and this gate will be open whenever there is a CK1 pulse on the output of the adder check circuit 22 and the clock pulse T40 does not appear on the input gate leg. Whenever the pulse T40 appears, it is effective to clear the recirculation and stop the oscillation within the check circuit 22.

Figure 8:
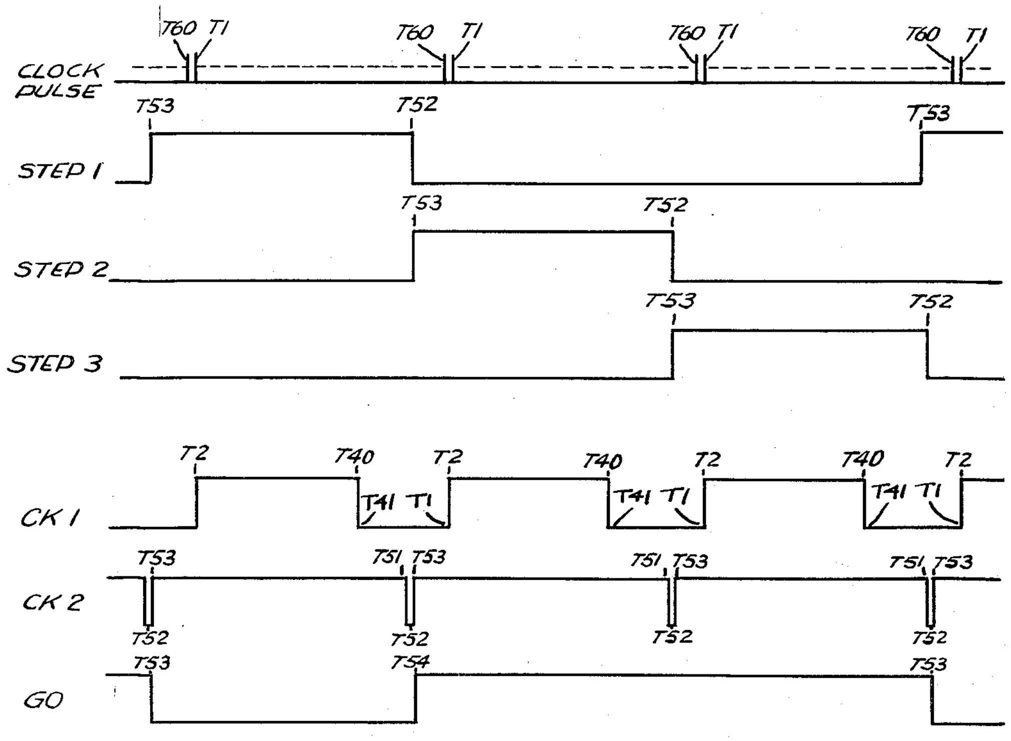
FIGURE 8 shows a representative timing diagram for the circuits incorporated in the FIGURE 2.

The output of the adder check circuit 22 under normal operation, will be as viewed in FIGURE 8. Here, the output line CK1 will be seen to go active at time T2. The reason for this will be apparent when it is noted, for example on gate 70, that at time T1 when there is an output ST1 from the first control section stage 11 of the controller 10 and adder check circuit 60 is cleared, the gate 70 will be open so that a pulse can be passed through the gate 70 to the output buffer line 75. This buffer line will connect to the recirculation line and will be applied to the gate 74. Since the other gate leg of the gate 74 is normally active except at time T40, the pulse CK1 will continue to recirculate through the gate 74 with the circulation starting at time T2. As mentioned above, the gate amplifier structure associated with the gate 70 will produce a one pulse period delay in the output so that when a T1 pulse passes through the gate 70, it will appear at the output at T2. The output line CK1 shown active in FIGURE 8 at time T2, indicates that the CK1 line has an oscillating signal present with a pulse present every pulse period and will continue to be present until a signal is applied to the gate 74 to stop recirculation. At time T40 the gate 74 will be closed due to the $\overline{T40}$ gate leg becoming inactive and the gate will remain closed so that there will be a $\overline{CK1}$ signal present on the output of the adder check circuit 22 from time T41 until such time as a subsequent pulse is passed through one of the gates to set the circuit back into an oscillatory state. Under conditions of normal operation, this will not occur until after time T1 and the other necessary pulses are applied to one of the gates 70, 71 or 72.

The duplicate function check or monitor circuit 23 shown in FIGURE 2 comprises a pair of gates 80 and 81. The gate 80 is adapted to receive a control pulse on one gate leg from the duplicate function circuit when the duplicate functions are identical. This duplicate function signal may be produced by circuits such as shown in FIGURE 6. It is necessary that the other leg of the gate 80 be active at time T52 in order to open the gate and produce a check pulse on the output buffer line 82. The gate 81 has four input gate legs. The first gate leg is adapted to be activated either by a $\overline{T54}$ signal or a $\overline{CK1}$ signal from the adder check circuit 22. The second gate leg of gate 81 is adapted to be activated either by a signal $\overline{T3}$ or CK1 pulse from the adder check circuit 22. The third gate leg is adapted to be active whenever there is a $\overline{T51}$ signal present or there is a signal from the duplicate function circuit indicating that the duplicate functions do not agree. This latter circuit may take the form of the circuit shown in FIGURE 5. The fourth gate leg is the recirculation gate leg which will apply a CK2 pulse to the gate 81 for recirculation whenever there is a CK2 pulse on the output buffer line 82.

FIGURE 8 at CK2 shows the normal output of the duplicate function check circuit 23. At time T51, the recirculation gate 81 will close due to the $\overline{T51}$ signal becoming inactive at this time and due to the duplicate function generator source 48 being inactive. Thus, the CK2 signal will be inactive at time T52. At time T52, a pulse will be applied to the set gate 80 and with the signal source 53 active, the gate 80 will be opened. Thus, at T53, the check circuit will be active until the next time T51 occurs. Thus, it will be seen that the circuit 23 will be inactivated once during each minor cycle or step of the main apparatus operation.

The GO circuit 25 functions as a combined monitor circuit for the check or monitor circuits 20, 22, and 23, and includes a pair of gate circuits 85 and 86. The gate 85 is adapted to be open when there is a continue operation signal from the source 31 on the first gate leg, a T53 pulse present on the second gate leg, and a step 2 pulse, ST2, on the third gate leg.

The gate 86 of the GO circuit 25 has eight gate legs, one of which is a recirculation gate leg and the others of which are associated with timing clock pulses, the weight adder check pulses and the check circuits 22 and 23. The first gate leg from left to right in the gate 86 is adapted to be activated by a $\overline{T54}$ signal or a $\overline{CK1}$ signal. The second gate leg is adapted to be activated by a $\overline{T3}$ signal or a CK1 pulse. The third gate leg is adapted to be activated by a $\overline{T4}$ signal or a CK2 check pulse. The fourth gate leg is adapted to be activated by a T51 pulse or a $\overline{CKA}$ signal and the fifth gate leg is adapted to be active upon the occurrence of the T51 pulse or a $\overline{CKB}$ signal. The sixth gate leg is adapted to be activated by a T51 or a $\overline{CKC}$ signal. The seventh gate leg is adapted to be activated by a $\overline{ST1}$ signal or a $\overline{T53}$ signal. The eighth gate leg is the recirculation gate leg which will apply a GO signal recirculation pulse whenever there is a pulse produced on the output buffer line 87. In the absence of the GO pulse on the buffer line 87, the package will have a $\overline{GO}$ signal present on the output lead 27.

Under conditions of normal operation, the GO circuit 25 will have an output on the GO line indicated by the timing diagram shown in FIGURE 8. The output buffer line 87 will have a pulse thereon at time T53. However, at time T53 and when the step one stage 11 is active, the seventh gate leg of the gate 86 will be closed and will de-energize the recirculation normally effective through the gate 86. This will mean that the GO line 26 will be deactivated and the $\overline{GO}$ line 27 will be active. The GO line 26 will remain inactive until a pulse has been applied through the gate 85 and this pulse will not appear on the output buffer line 87 until time T54. This output pulse at time T54 will occur on the output of gate 85 when there is a T53 pulse applied thereto, an ST2 pulse, and the continue operation circuit 31 is active. This will mean that the buffer line 87 will have a pulse thereon and it will be recirculated, in the absence of a circuit failure, until two minor cycle periods later just after the apparatus has been started on the subsequent major cycle as will be apparent from the description that follows on the over-all configuration of FIGURE 2.

The step 1 stage or minor cycle stage 11 of the operation controller 10 comprises three gates 90, 91 and 92. The gate 90 has three input gate legs, the first being a step gate leg activated by the output ST of the weight count adder check circuit 20, the second gate leg being the GO gate leg activated by the output of the GO circuit 25, the third gate leg being activated by the step 3 stage 13 output ST3. The gate 91 has as an input a manual start signal 30 which is adapted to apply a starting pulse through the gate 91 to the output buffer line 93 when it its desired to initiate operation of the machine controller 10. The gate 92 is a recirculation gate having one gate leg for recirculation or oscillation purposes and a second gate leg which is active when there is a CK2 pulse from the duplicate function check circuit 23.

As shown in FIGURE 8, the step 1, stage 11 will normally be activated at time T53 and will continue to oscillate with a pulse on the buffer 93 each pulse period until such time as the gate 92 is cleared by the absence of the CK2 pulse which will be at time T52. This step 1, stage 11 will remain inactive until there has been a recirculation of a pulse from the step 3 stage 13 and there is a suitable control signal indicating that a further major cycle is to be produced.

The second step, stage 12, comprises a pair of gates 95 and 96 connected to a common buffer line 97. The gate 95 has as an input thereto a step pulse from the weight count adder check and step control circuit 20. A further gate leg input to the gate 95 is a $\overline{GO}$ signal from the GO circuit 25. The third gate input is from the step 1 stage 11. Whenever all three inputs are present on the input of the gate 95, there will be an output pulse produced on the output buffer line 97. This signal will be recirculated through the gate 96 so long as the CK2 pulse line has a pulse at the time that the recirculation pulse is applied to the other gate leg of the gate 96. This will continue until the CK2 pulse is down at time T52 as shown in FIGURE 8. Thus, the step 2 output, as shown in FIGURE 8, will start immediately following step 1 starting at time T53 and running through time T52 of the cycle immediately following the minor cycle of step 1.

The step 3 stage 13 of the operation controller 10 is of the same general type as the aforementioned stages and comprises a pair of gates 98 and 99 which are adapted to feed an output buffer line 100. The input signals to the gate 98 are from the step signal line 21 and from the step 2 line 16 so that when there is a signal appearing on both of the input gate legs, there will be an output pulse on the buffer line 100. This pulse will be recirculated through the gate 99 so long as there is a CK2 pulse present and this CK2 pulse will be present, under proper operating conditions, until time T52 at which time gate 99 will be closed and the stage 13 will be cleared. Thus, in FIGURE 8, step 3 will start at time T53 and will continue to be active until time T52 of the next clock cycle. At time T52 the gate 99 will be closed and the gate will remain closed until a step 3 minor cycle is called for in the subsequent major cycle.

*Normal system operation of FIGURE 2*

In considering the over-all operation of the circuitry shown in FIGURE 2, it is first assumed that the weight adder check circuits 60, 61 and 62 are all operating properly and that no errors are detected. Further, it is assumed that the duplicate function check is producing an output indicating that the duplicate functions which are being checked are identical. It is further assumed that the continue operation signal source 31 is active so that the apparatus will step through more than one major cycle.

When the operator desires to initiate the operation of the controller 10, he will activate the manual start source 30, which, at time T52, will produce an output pulse which is fed through the gate 91 to the buffer line 93. The pulse from the buffer line will be an ST1 pulse and will be recirculated through the gate 92. The recirculation gate will be open due to the fact that there will be a CK2 pulse from the duplicate function check circuit 23. The reason there will be a CK2 pulse will be apparent when examining FIGURE 8 and noting that at time T53 the CK2 line is active producing pulses every pulse period from time T53 until T51 of the next clock period. In viewing the duplicate function check circuit 23 in closer detail, it will be noted that at time T52, at the instant that a start pulse is applied to the manual start source 30, one of the legs of the gate 80 will be active and the duplicate function circuit of the gate leg of the gate 80 will also be active so that a pulse will be passed through to the buffer line 82. The pulse on the buffer line 82 will be recirculated through the gate 81 until the gate is closed by the pulse $\overline{T51}$. Normally, the line 24 on the output of the circuit 23 will have a continuous chain of pulses until T52 at which time it is desired to close the gate 92 of the step 1 stage 11.

It is now desired to step into the second minor cycle wherein the step 2 stage 12 is active. At time T52, a step pulse will be produced on the output line 21 of the weight count adder 20 and this will open one of the gate legs of the gate 95 of stage 12. The $\overline{GO}$ leg of the gate 95 will also be active as will be seen from an examination of the GO circuit 25. Insofar as the first major cycle operation is concerned, the gate 85 will not have been opened since in passing from step 1 to step 2, the ST2 gate leg of gate 85 will not be open so that there will be no output pulse applied to the buffer line 87. Consequently, there will be nothing to recirculate through the gate 86 and the $\overline{GO}$ output line 27 will be active. Further, at time T52, the gate leg 15 on the input of the gate 95 of the stage 12 will be active. With all three of the input gate legs active, an output pulse will appear on the output buffer line 97 at time T53 and this output pulse will be recirculated through the gate 96 since the CK2 leg of the gate 96 will be active at time T53. The apparatus will continue to operate in the second minor cycle defined by step 2 producing a series of output pulses due to the recirculation through the gate 96 until the CK2 gate leg on gate 96 is closed. This gate leg will be closed at time T52. However, at time T52 of the next minor cycle, the weight count adder check circuit 20 will have an output pulse on line 21 which will call for a step signal ST on the input of the gate 98. With the corresponding ST2 signal at time T52 on gate leg 16, the gate 98 will be open and a pulse will be applied to the output buffer line 100. This pulse will be the first ST3 pulse and will appear at time T53 as shown in FIGURE 8. The ST3 pulse will be recirculated through the gate 99 as long as the CK2 pulse is present, and the CK2 pulse will remain present until the end of the next timing period at time T52 at which time the gate leg for pulse CK2 will be closed. Thus, the recirculation through the gate 99 will stop.

With the continue operation signal source 31 active, the GO output line 26 of the GO circuit 25 will be active and will be carrying output pulses. It will be noted that the GO circuit 25 will normally be active having been made active during step 2. This will be seen when it is noted that the gate 85, with step 2 active and at time T53 will be open so that a pulse will appear on the buffer line 87. This pulse will be recirculated through the gate 86 until after the apparatus has stepped into step 1 of the next major cycle. As soon as it has stepped into step 1 of the next major cycle, the seventh gate leg of the gate 86 will be closed by a $\overline{T53}$ signal and an $\overline{ST1}$ signal, both being deactivated at the same time. Thus, the GO circuit 25 will become active at time T54 of the second minor cycle of step 2 and will remain active until time T53 on the first minor cycle of the next major cycle. This will mean that the output GO line 26 will have a pulse on at time T52 at the time that it is desired to initiate the first minor cycle of the next major cycle. At time T52, the step line 21 from the weight count adder check circuit 20 will be active and there will be an ST3 pulse from the stage 13 to open the gate 90.

When the apparatus is recycled into cycle 1 of the next major cycle, the apparatus will continue to step through the minor cycles in the order of step 1, step 2, step 3 until such time as the continue operation signal 31 is inactivated to thereby close the gate 85. When this occurs, the GO signal on output line 26 will be inactive and consequently the GO line on the input of the gate 90 will be inactive so that it will be impossible for there to be a further circulation once the major cycle in operation at the time the continue operation circuit 31 was inactivated.

Next to be considered in the over-all functioning of the system shown in FIGURE 2 are the various circuit failures which will cause the operation control circuit 10 to stop. Whether or not the apparatus will stop at the end of a minor cycle, during the minor cycle, or at the end of a major cycle depends upon the type of failure.

*Weight adder check circuit failure*

Should there be a failure of any of the weight adder check circuits 60, 61, 62 to produce a check pulse indicating that the weight check has been correctly made, the gate on the particular check circuit which did not make a check will not be opened and consequently there will be a lack of a signal to open the gate 66. When the gate 66 does not open, it is impossible to produce a step pulse on the line 21 and consequently the step gate on the gates 90, 95 and 98 will never be active so that these gates can not open. Thus, if there should be a failure of one or more of the weight adder check circuits to produce a check pulse during step 1 when the stage 11 is active, the circuit will never go on to step 2 because of the lack of the step pulse on the weight count adder check circuit output line 21.

The apparatus will remain in the off position until an attempt is made to start a further major cycle. The activation of the manual start source 30 will start another major cycle but until the fault causing the weight adder to indicate a failure is cleared, the apparatus will never get into step 2 of the second minor cycle.

The same operation will be true whether the weight adder check circuits 60, 61 or 62 are failing internally or there has been a loss of information wherein there is a failure to obtain the proper weight count check pulse.

*Weight count adder check circuit does not clear*

Under normal conditions, the weight count check will be made at time T50 and the weight count adder check circuits will be cleared by time T1. However, if the weight count adders do not clear by time T1, it is desired to prevent further apparatus operation. This is produced in the present circuit by means of the adder check or monitor circuit 22 which will fail to produce an output check pulse if the adder check circuit does not clear. If it is assumed that the weight adder check circuit 60 produces a proper weight count check pulse but does not clear, it will be seen during step 1 that the adder check or monitor circuit 22 will not produce an output CK1 pulse.

Looking at the gate 70 of the adder check or monitor circuit 22 more closely, it will be noted that if the adder A does not clear, the middle gate leg of the gate 70 will never be opened and consequently there can be no pulse produced in the output buffer line 75, so that the CK1 output will not be active. This will mean that in the second check circuit on the duplicate function check or monitor circuit 23 on gate 81 that the second gate leg will be deactivated at time T3 due to the lack of pulse $\overline{T3}$ and the lack of an active pulse on the CK1 line. This will mean that while the circulation gate 81 was open before, it will now be closed so that there will be no further CK2 pulse in the output buffer line 82. Consequently, with no CK2 pulse available, it will be impossible to step from step 1 to step 2 as the CK2 line on gate 96 will not be capable of opening the recirculation gate 96 of the second step stage 12. Furthermore, ST1 will be immediately deactivated at this instance to prevent further operation.

In similar fashion should the weight adder check circuits 61 and 62 fail to clear, the CK2 pulse will never be applied and the apparatus will stop. It will be noted that the adders A, B, and C associated with the gates 70, 71 and 72 are each checked for clearing during a different step or minor cycle of the major cycle. This is done to simplify the over-all circuitry and will not unduly affect the checking features of the circuit since the circuit will never be able to go beyond two minor cycles before the apparatus will stop.

It will be apparent that this particular checking or monitor circuit represents one application of the principles of the present invention wherein a check is made to see if a circuit is operating properly and then a subsequent check is made to see if it is inactive. Unless the circuit demonstrates the ability to be both active and inactive; that is to demonstrate that it is capable of producing a correct operation and a failure indication, the apparatus operation will be stopped.

*Duplicate function failure*

In the event that the duplicate functions do not agree in the duplicate checking circuit as set forth in FIGURE 6, there will be no output from the duplicate function circuit, gate 53. This will mean that the gate leg connected thereto on the gate 80 will not be open and it will be impossible to produce a CK2 pulse in the output buffer line 82. Consequently, it will be impossible to maintain operation in any minor cycle due to the lack of the recirculation gate by CK2 being active on any of the stages 11, 12 or 13.

*Duplication function not identical check*

If there should be an indication that the duplication functions being checked are not identical, the signal source 48 will be active to maintain a signal on the third gate leg of the recirculation gate 81 of the duplicate function check circuit. This will mean that the gate will be open and CK2 will not become inactive at time T52 as is normally the case. Since the CK2 signal pulse is present, it will be fed to the adder check circuit 22 on gate 73 so that at time T52, when there is a pulse applied to one of the gate legs of the gate 73, the two pulses will pass through the gate 73 and therefore a CK1 pulse will appear upon the output buffer line 75. Normally, at time T52 until time T2, the CK1 pulse signal will be down as evidenced in FIGURE 8. However, the presence of the CK2 pulse at time T52 will activate the circuit 22 so that there will be a circulation of pulses within the circuit. With the CK1 pulse present, it will be apparent that the $\overline{CK1}$ signal will not be present. With the $\overline{CK1}$ not present, and at time T54, the first gate leg of the GO circuit recirculation gate 86 will be closed. Consequently, the GO circuit line 26 will not be activated and it will be impossible to get into step 1 of the next major cycle since the gate 90 of stage 11 requires that the GO signal be active in order to start the second and subsequent major cycles.

*GO circuit failure*

If there should be a failure of the GO circuit 25 so that the circuit fails in the active state with the GO line 26 having pulses thereon continuously, should such a failure take place after the initiation of step 2, the apparatus will continue to operate through step 3 and then step 1 until it is time to go back into step 2. It will be noted that in step 2, it is necessary that the GO circuit be deactivated so that the $\overline{GO}$ line 27 will have an output thereon. Thus, if the GO circuit 25 has failed in the on position, it will be apparent that the $\overline{GO}$ signal will never come up and it will be impossible to get into step 2 of the next cycle.

Similarly, if the GO circuit should fail in the off position so that the $\overline{GO}$ line is always active, the apparatus will be able to go from step 1 through step 3 but will not be able to go back into step 1 due to the fact that this circuit requires that the GO line be active in order to initiate step 1 of a subsequent major cycle.

It will thus be seen that the GO circuit must be operating and capable of indicating both an on and off condition in order for the control circuit to go through a complete operating major cycle. To insure that this operation is checked, it will be apparent that the GO circuit is forced into the inactive state periodically during step 1 immediately after step 1 has been initiated at time T53. In other words, the seventh gate leg of gate 86 of the GO circuit 25 is closed at time T53 during step 1.

It will be noted that the GO circuit 25 includes in the fourth, fifth and sixth gate legs of the gate 86 means for checking to insure that the adder check circuits 60, 61 and 62 on the output of the gates 63, 64 and 65 are inactive at all times except at time T51. If at any other time than at time T51, $\overline{CKA}$, $\overline{CKB}$, $\overline{CKC}$ should not be present, the gate 86 will be closed for recirculation and it will be impossible to get back into step 1 of the next major cycle.

*Adder check or monitor circuit failure*

If the adder check or monitor circuit 22 should fail, the machine operation will be stopped. If the circuit 22 should fail on, so that there is a continuous output of CK1 pulses, the GO circuit gate 86 will be closed since the first gate leg at time T54 will be inactive and there will be no $\overline{CK1}$ signal to hold the gate leg open to permit recirculation. Consequently, the GO circuit can not recirculate and it will be impossible to get back into step 1 of the next major cycle.

In the event that the check circuit 22 should fail in an inactive state so that there is a continuous output signal $\overline{CK1}$, the GO circuit gate 86 will again be closed, this time at time T3 when the second gate leg will have $\overline{T3}$ applied thereto and there will be no CK1 pulse present at time T3 to hold the gate open. Consequently, the GO circuit will again be deactivated and it will be impossible to get into step 1 of the next major operating cycle.

As will be apparent from the foregoing description, in order to maintain the GO circuit 86 open, it is necessary that the adder check circuit 22 periodically indicate proper operation and an ability to indicate an improper operation. The improper operation indication is forced on the check circuit by deactivating the check circuit at time T40 by the application of the pulse $\overline{T40}$. In other words, during each minor cycle, the check circuit 22 is examined to see if it is capable of producing a normal on indication and a failure indication. If it is incapable of producing both indications, the apparatus operation will stop.

*Duplicate function check or monitor circuit failure*

In the event that the duplication function check or monitor circuit 23 should fail in the off condition so that there is no CK2 pulse, it will be impossible to step from one step to the next after the initial starting operation of each cycle period. This is due to the lack of a CK2 pulse on the recirculation gate associated with each of the step stages 11, 12 and 13.

If the duplicate function check circuit 23 should fail in the on condition, the CK2 pulse will be present on the input gate 73 at the same time that the T52 pulse is present to thereby activate gate 73 and produce an output pulse on the buffer line 75 of the adder check circuit 22. With this CK1 pulse present, it will be impossible to hold the GO circuit gate 86 open at time T54 when the first gate leg of the gate 86 is closed by the presence of the signal $\overline{T54}$. Consequently, with the GO circuit de-energized, the apparatus will not be able to step into the first step of the next major cycle.

In order to check the operation of this duplicate function check circuit 23, the check circuit is periodically deactivated by the signal $\overline{T51}$ on the third gate leg of the gate 81 and if the gate is not deactivated, it will be impossible to hold the first gate leg of the gate 86 open. Consequently, a check is periodically made to see if the duplicate function check circuit is capable of failing and if it does not fail, the apparatus will be stopped before it can switch into the first step of the next major cycle.

It will be readily apparent from the foregoing description that there has been provided a new and novel circuit for a computer or the like wherein a check is periodically made to see if the checking circuitry and checking circuitry monitors are capable of indicating a failure should a failure occur. It will be further apparent that this has been accomplished by circuitry which checks to see if the circuit is operating properly at the time it is desired for it to be active and to see if it is inactive during a checking interval. The absence of a check pulse at either time, will be used to deactivate the central apparatus and stop further operation.

While, in accordance with the provisions of the statutes, there has been illustrated and described a preferred form of the invention, it will be apparent to those skilled in the art that changes may be made in the form of the apparatus disclosed without departing from the spirit of the invention as set forth in the appended claims, and that in some cases, certain features of the invention may be used to advantage without a corresponding use of other features.

What is claimed, for which it is desired to secure by Letters Patent, is:

1. An electrical circuit controller comprising a plurality of sequentially operative control stages, a bistable circuit monitor having an assertive state indicative of proper operation and an inhibited state normally indicative of improper operation, means connecting said circuit monitor to said electrical circuit controller to control the sequential operation of said plurality of control stages of said electrical circuit controller, said last named means comprising automatically operative means connected to switch said monitor to the inhibited state after the initial operation thereof in the assertive state, and means directly responsive to the inhibited circuit monitor connected to one of said plurality of control stages to initiate one of the sequential operations of said electrical circuit controller.

2. A multiple step controller comprising a plurality of stages, means connected to said stages to sequentially activate said stages, a bistable controller monitor having at least a first and a second state of operation and having first and second output leads, said monitor when in said first state of operation normally producing a signal indicating proper operation on said first output lead and when in said second state of operation normally producing a signal indicating a failure on said second output lead, an automatic periodically operative signal source connected to said monitor to switch the state of said monitor to said second state and produce a signal indicating a failure for a period of time, and means connecting said first output lead of said controller monitor to one of said plurality of stages and said second output to a second one of said plurality of stages so that when said monitor is in said first state and producing a signal indicating proper operation, said one of the series stages will be conditioned to be active and when said monitor is in said second state and producing a signal indicating a failure, said second one of said series stages will be conditioned to be active.

3. A dynamic pulse control circuit having a plurality of oscillating stages connected in a series circuit, means including the preceding stage adapted to activate to oscillation in sequence said stages, a bistable monitor circuit having a first output circuit which is adapted to have thereon a first output signal indicative of proper operation when in one of said bistable states and a second output circuit which is adapted to have thereon a second output signal indicative of circuit failure when in the other of said bistable states, means connecting said first and second output circuits of said monitor circuit to selected ones of said stages so that when said first output signal is present on said first output circuit, a first of said stages to which said first output circuit is connected will be activated and when said second output signal is present on said second output circuit, a second of said stages to which said second output circuit is connected will be conditioned to be activated, and automatically operative circuit means connected to said monitor circuit to switch said monitor circuit to said other bistable state to produce said second output signal at the instant that it is desired to activate the second of said stages to thereby check the operation of said monitor circuit.

4. A pulse control circuit comprising a plurality of control stages interconnected to be sequentially actuated, a recirculation path including a pulse gate connected to each of said stages so that said stages will be conditioned to be in an oscillating state when said gate is open, a check circuit connected to a circuit to be monitored and having an output signal indicative of proper or improper monitored circuit operation connected to control the opening and closing of said gate, and circuit means connected to said check circuit to automatically force said check circuit to produce an output signal indicative of an improper operation prior to the actuation of the next sequentially actuated stage, to check the operation of said check circuit.

5. In combination, a repetitively operating pulse control circuit, a repetitively operating oscillating controller, automatically operative means connected to said controller for interrupting the oscillating state of said controller during each repetitive operation of said pulse control circuit, and means connected to said controller sensing the changes in said oscillating state of said controller between an oscillating and non-oscillating state to initiate the furtherance of the repetitive operation of said pulse control circuit.

6. In combination, a control circuit adapted to be cyclically operative, a checking circuit having an oscillating and a non-oscillating state and being connected to a portion of said control circuit to initiate cyclic operation of said control circuit when said checking circuit is in an oscillating state, and means maintaining said control circuit in a fixed cycle when said checking circuit indicates a failure by the loss of oscillation, said last named means including automatically operative means for cyclically interrupting the oscillation of said checking circuit to effect an indication of failure in said checking circuit.

7. An electrical circuit controller for a data processing apparatus comprising a plurality of control stages connected to be sequentially operative, a circuit monitor having an output circuit having thereon a train of output pulses when there is proper circuit operation, means connecting said circuit monitor to said circuit controller to control the sequential operation of said electrical circuit, said last named means comprising means for automatically inhibiting the pulse output of said circuit monitor after the initial operation thereof, and means responsive to the output of said circuit monitor when inhibited to initiate one of the sequential operations of said controller.

8. A multiple step controller for a pulse type transfer apparatus comprising a plurality of stages, means connected to said stages to sequentially activate said stages, a controller monitor having an oscillating and non-oscillating state of operation, said oscillating state of operation normally indicating proper operation of the controller being monitored and said non-oscillating state of operation normally indicating a failure of the controller being monitored, a periodically and automatically operative signal source connected to said controller monitor to actuate said monitor to said non-oscillating state for a period of time, and means connecting said controller monitor to said plurality of stages so that when said monitor is in said oscillating state, one of the series stages will be conditioned to be active and when said monitor is in said non-oscillating state, another of said series stages will be conditioned to be active.

9. In a pulse handling apparatus, the combination comprising a function checking device having two stable states, one of which is a pulse output state wherein pulse signals may be passed therethrough and thereby be indicative of a first condition of the function being monitored and the other state which is a no pulse output state indicative of a second condition of the function being monitored, first circuit means connected to said checking device to check if said device is in said pulse output state at a predetermined instant, an automatically operative signal pulse source connected to said checking device to switch it to said no pulse output state, second circuit means connected to said checking device to check if said device is in said no pulse output state at a second predetermined instant, and a failure indicating means connected to said first and said second circuit means to be actuated when said first and said second circuit means indicate a failure of said function checking device.

10. In combination, a data processing apparatus, a weight count adder connected to said processing machine to produce an output pulse when there is a weight count check, and a further output when the check is not being made, a first check circuit connected to said weight count adder and adapted to have as an input said output pulse, a second check circuit connected to said weight count adder and adapted to have as an input said further output, means connecting the output of said first check circuit to said second check circuit, an apparatus program controller having a plurality of stages connected to be sequentially operated, and means coupling said second check circuit to said program controller to condition said stages for sequential operation.

11. Apparatus for controlling a data processing apparatus comprising a major cycle programmer, said programmer having a plurality of sequentially actuated minor cycle stages, a circuit monitor for indicating proper circuit operation of a monitored circuit connected to condition one of said stages for actuation so that a minor cycle may be performed, an automatically operative timed signal circuit connected to said circuit monitor to cause said monitor to indicate a failure, and means connecting said circuit monitor to another of said stages to condition said other stage for actuation when said timed signal circuit is effective so that a further minor cycle may be performed if said monitor indicates a failure and said further minor cycle will not be performed if said monitor does not indicate a failure.

12. Apparatus for controlling a data processing apparatus comprising a major cycle programmer, said programmer having a plurality of minor cycle stages connected to be actuated in sequence by means including the preceding stage, a monitor circuit for said programmer connected to condition each of said minor cycle stages for sequential actuation when said monitor indicates a first state of circuit operation, an automatically operative timed signal source connected to said circuit monitor to force said monitor circuit to indicate a second state of operation during each minor cycle prior to the start of the next minor cycle, means connected to said monitor circuit to sense said second state of said circuit monitor when present to condition said circuit monitor for further operation, and means including said circuit monitor connected to inhibit further programmer operation upon the completion of the existing programmer cycle.

13. Apparatus as defined in claim 12 wherein said monitor circuit comprises an oscillatory circuit having a signal recirculation gate, a timed pulse source and a function indicating source connected to periodically close said gate to stop the oscillation of said circuit.

References Cited in the file of this patent

UNITED STATES PATENTS

| | | |
|---|---|---|
| 2,569,829 | Rabenda | Oct. 2, 1951 |
| 2,658,681 | Palmer et al. | Nov. 10, 1953 |
| 2,716,186 | Ford | Aug. 23, 1955 |
| 2,775,402 | Weiss | Dec. 25, 1956 |
| 2,779,936 | Loudon | Jan. 29, 1957 |
| 2,798,214 | Rowell | July 2, 1957 |
| 2,910,236 | Harper | Oct. 27, 1959 |

FOREIGN PATENTS

| | | |
|---|---|---|
| 737,863 | Great Britain | June 21, 1950 |
| 749,836 | Great Britain | Mar. 30, 1953 |